(12) United States Patent
Leibov et al.

(10) Patent No.: US 11,952,100 B2
(45) Date of Patent: Apr. 9, 2024

(54) JOINT FOR CONNECTING A CENTER WING BOX AND BULKHEAD IN AN AIRCRAFT

(71) Applicant: The Boeing Company, Chicago, IL (US)

(72) Inventors: David Leibov, Seattle, WA (US); Ryan Carruthers, Seattle, WA (US); Daniel Cox, Seattle, WA (US); Scott Michael Cox, Everett, WA (US); Nicholas Joseph Dominski, Seattle, WA (US); Jeffery M. Lazzaro, Mill Creek, WA (US); Roslyn Melookaran, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 6 days.

(21) Appl. No.: 17/577,712

(22) Filed: Jan. 18, 2022

(65) Prior Publication Data
US 2022/0234715 A1    Jul. 28, 2022

Related U.S. Application Data

(60) Provisional application No. 63/142,117, filed on Jan. 27, 2021.

(51) Int. Cl.
*B64C 1/26* (2006.01)
*B64F 5/10* (2017.01)

(52) U.S. Cl.
CPC . *B64C 1/26* (2013.01); *B64F 5/10* (2017.01)

(58) Field of Classification Search
CPC ........................................................ B64C 1/26
See application file for complete search history.

(56) References Cited

U.S. PATENT DOCUMENTS 2,140,672 A     12/1938  Gray et al.
5,086,996 A  *   2/1992  Roeder .................... B64C 1/10
                                                    244/119

(Continued)

FOREIGN PATENT DOCUMENTS

CA         3028094 A1      6/2019
DE    102006042748 A1      3/2008

(Continued)

*Primary Examiner* — Joshua J Michener
*Assistant Examiner* — Michael B. Kreiner
(74) *Attorney, Agent, or Firm* — COATS & BENNETT, PLLC

(57) ABSTRACT

A joint for connecting a center wing box to a bulkhead of an aircraft. The joint includes a flex angle member with a first section shaped to abut against and be connected to the center wing box, a second section shaped to abut against and be connected to a first side of the deck of the bulkhead, and an intermediate rounded corner positioned between the first and second sections. First support members are attached to the center wing box at first pins and support a first side of the second section of the flex angle member. Second support members are attached to the web of the bulkhead at second pins and support a second side of the second section of the flex angle member. The first support members are positioned on a first side of the deck of the bulkhead and the second support members are positioned on an opposing second side of the deck.

20 Claims, 8 Drawing Sheets

(56) References Cited

U.S. PATENT DOCUMENTS

| | | |
|---|---|---|
| 7,546,979 B1 | 6/2009 | Estell et al. |
| 8,016,234 B2* | 9/2011 | Muller .................... B64C 1/061 |
| | | 244/119 |
| 8,770,518 B2 | 7/2014 | Guittard et al. |
| 9,199,717 B2 | 12/2015 | Bogiatzis |
| 9,731,808 B2 | 8/2017 | Charles et al. |
| 10,589,836 B2* | 3/2020 | Sankrithi ............... B64D 11/00 |
| 10,604,276 B2* | 3/2020 | Mindock ................ B05B 14/30 |
| 10,773,787 B2* | 9/2020 | Griess ..................... B64C 1/26 |
| 10,871,232 B2 | 12/2020 | Laverne et al. |
| 11,479,336 B2* | 10/2022 | Leibov .................... B64C 1/26 |
| 2009/0137196 A1 | 5/2009 | Klug et al. |
| 2009/0236472 A1 | 9/2009 | Wood |
| 2009/0236473 A1 | 9/2009 | Rawdon et al. |
| 2009/0283637 A1 | 11/2009 | Nolla |
| 2011/0233334 A1 | 9/2011 | Stephen |
| 2012/0267478 A1 | 10/2012 | Dazet |
| 2012/0280083 A1 | 11/2012 | Dazet |
| 2012/0305709 A1 | 12/2012 | Bense |
| 2014/0059860 A1* | 3/2014 | Hsueh ..................... B64C 1/26 |
| | | 29/897.2 |
| 2014/0196831 A1 | 7/2014 | Ayers et al. |
| 2016/0185451 A1 | 6/2016 | Bellet et al. |
| 2017/0088248 A1 | 3/2017 | Stahl et al. |
| 2018/0113425 A1 | 4/2018 | Nakashima et al. |
| 2019/0061906 A1 | 2/2019 | Ewing |
| 2019/0112034 A1* | 4/2019 | Bellet .................... B64C 25/16 |
| 2019/0112035 A1* | 4/2019 | Bellet .................... B64C 25/04 |
| 2020/0108908 A1 | 4/2020 | Cominsky et al. |
| 2020/0189714 A1 | 6/2020 | Murphy et al. |
| 2020/0207455 A1 | 7/2020 | Gauthie |
| 2021/0188418 A1 | 6/2021 | Leibov et al. |
| 2022/0212773 A1* | 7/2022 | Vukosav .................. B64C 1/26 |
| 2022/0227474 A1* | 7/2022 | Vukosav ................ B64C 1/069 |
| 2022/0234715 A1 | 7/2022 | Leibov et al. |
| 2022/0234716 A1* | 7/2022 | Young .................... B64C 1/069 |
| 2023/0148389 A1 | 5/2023 | Orteu et al. |

FOREIGN PATENT DOCUMENTS

| | | |
|---|---|---|
| DE | 102015116591 A1 | 3/2017 |
| EP | 2239195 A1 | 10/2010 |
| FR | 2894225 A1 | 6/2007 |
| WO | 2009056643 A2 | 5/2009 |
| WO | 2018203190 A1 | 11/2018 |
| WO | 2021032658 A1 | 2/2021 |

* cited by examiner

JOINT FOR CONNECTING A CENTER WING BOX AND BULKHEAD IN AN AIRCRAFT

RELATED APPLICATIONS

This application claims priority from U.S. Provisional App. No. 63/142,117, filed 27 Jan. 2021, the disclosure of which is incorporated by reference herein in its entirety.

TECHNOLOGICAL FIELD

The present disclosure relates generally to the field of aircraft and, particularly, to a connection between sections of an aircraft.

BACKGROUND

Aircraft can include a center wing box that is positioned between and connected to the wings. The center wing box experiences stresses such as tension, compression, shear and torsion due to aerodynamic forces from the wings while in flight, and due to the weight of the wings themselves and from the fuel contained within the wings when the aircraft is on the ground. In addition, the center wing box transmits forces from the wings to the fuselage.

Aircraft can be manufactured in a modular fashion. Different sections of the aircraft can be manufactured separately and then brought together and assembled. For example, a wing assembly can be manufactured separately from a fuselage. During the assembly process, a mostly complete fuselage is lowered onto a complete wing and then connected together. This can enable high production rates and save factory space and assembly costs. This modular approach requires a secure connection that adequately connects the center wing box to the fuselage.

SUMMARY

One aspect is directed to a joint for connecting a center wing box to a bulkhead of an aircraft with the bulkhead comprising a web and a deck. The joint comprising a flex angle member comprising a first section shaped to abut against and be connected to one of the center wing box and the bulkhead, a second section shaped to abut against and be connected to a first side of the deck of the bulkhead, and an intermediate rounded corner positioned between the first and second sections. First support members are attached to the center wing box at first pins. Second support members are attached to the web of the bulkhead at second pins. One of the first and second support members supports the second section of the flex angle member. The first support members are positioned on a first side of the deck of the bulkhead and the second support members are positioned on an opposing second side of the deck.

In another aspect, the first support members support the second section of the flex angle member and the first pins are coincident with a center of a radius of the intermediate rounded corner of the flex angle member.

In another aspect, the second support members support the second section of the flex angle member and the second pins are positioned at a point incident with a center of a radius of the rounded corner that is positioned at an intersection of the web and the deck of the bulkhead.

In another aspect, support fittings are attached to the center wing box with the first support members mounted to the support fittings with the first pins; and stiffeners are mounted on the web of the bulkhead with the second support members mounted to the stiffeners with the second pins.

In another aspect, the first and second support members comprise a lug with opposing clevis and the support fittings and stiffeners are positioned between the clevis.

In another aspect, the flex angle member is constructed from one of fiber reinforced composite and metallic material.

In another aspect, corner fittings are laterally offset from the flex angle member and comprise first and second sections aligned at an angle to fit at an intersection of the center wing box and the bulkhead with the corner fittings comprising a different construction than the flex angle member and are less flexible than the flex angle member.

In another aspect, the flex angle member is a first flex angle member and abuts against and is connected to the center wing box and further comprising a second flex angle member that abuts against and is connected to the web of the bulkhead and the deck.

In another aspect, the first and second support members are aligned in pairs with the first and second support members of each of the pairs overlapping on opposing sides of horizontal deck.

One aspect is directed to an aircraft comprising: a fuselage; a wing assembly comprising a center wing box positioned in the fuselage and wings that extend outward from opposing sides of the fuselage; a bulkhead positioned in the fuselage and comprising a web and a deck; and a joint that connects the center wing box to the bulkhead. The joint comprises: a flex angle member comprising a first section that is connected to one of the center wing box and the bulkhead, a second section that extends across the deck of the bulkhead, and an intermediate corner positioned between the first and second sections; first support members spaced apart across a width of the fuselage on a first side of the deck; and second support members spaced apart across a width of the fuselage on an opposing second side of the deck and with one of the first and second support members contacting against the second section of the flex angle member.

In another aspect, the first support members support the second section and the first support members are attached to the center wing box with pins that are located at a center of a radius of the corner.

In another aspect, the second support members support the second section and are attached to the web with pins that are located at a center of a radius of the corner.

In another aspect, the first and second support members are aligned in pairs along the width of the fuselage, with the first and second support members of each of the pairs overlapping on opposing sides of the deck.

In another aspect, the flex angle member is a first flex angle member that is attached to the center wing box and further comprising a second flex angle member with a first section that is attached to the web, a second section that is positioned across the deck, and a rounded intermediate corner.

In another aspect, the flex angle member is located along a central section of the fuselage and further comprising angled corner fittings laterally offset from and on opposing sides of the flex angle member with the angled corner fittings having an angled shape to contact against the center wing box and the deck of the bulkhead and comprising a different construction than the flex angle member and are less flexible than the flex angle member.

In another aspect, the flex angle member is a first flex angle member that is connected to the center wing box and further comprising one or more additional flex angle members with the additional flex angle members comprising a first section that is connected to the center wing box, a second section that extends outward from the center wing box and extends across the deck of the bulkhead, and an intermediate corner.

One aspect is directed to a method of connecting a center wing box to a bulkhead of an aircraft. The method comprises: positioning an intermediate rounded corner of a flex angle member at an intersection of the center wing box and the bulkhead; connecting a first section of the flex angle member to the center wing box; connecting a second section of the flex angle member to the bulkhead; connecting first support members to the center wing box and contacting a first side of the second section of the flex angle member; and connecting second support members to the bulkhead and overlapping with the first and second support members on opposing sides of the bulkhead.

In another aspect, the method comprises connecting the first support members to the center wing box with first pins that are located at a center of a radius of the rounded corner.

In another aspect, the flex angle member is a first flex angle member and further comprising: connecting a first section of a second flex angle member to a first section of the bulkhead; connecting a second section of the second flex angle member to a second section of the bulkhead; positioning a rounded corner of the second flex angle member that is positioned between the first and second sections at an intersection of the first and second sections of the bulkhead; and connecting the second support members to the bulkhead within pins that are coincident with a radius of the rounded corner.

In another aspect, the method comprises attaching a first corner fitting to the center wing box on a first lateral side of the flex angle member and attaching a second corner fitting to the center wing box on a second lateral side of the flex angle member with the first and second corner fittings abutting against the flex angle member.

The features, functions and advantages that have been discussed can be achieved independently in various aspects or may be combined in yet other aspects, further details of which can be seen with reference to the following description and the drawings.

DETAILED DESCRIPTION

Figure 1:
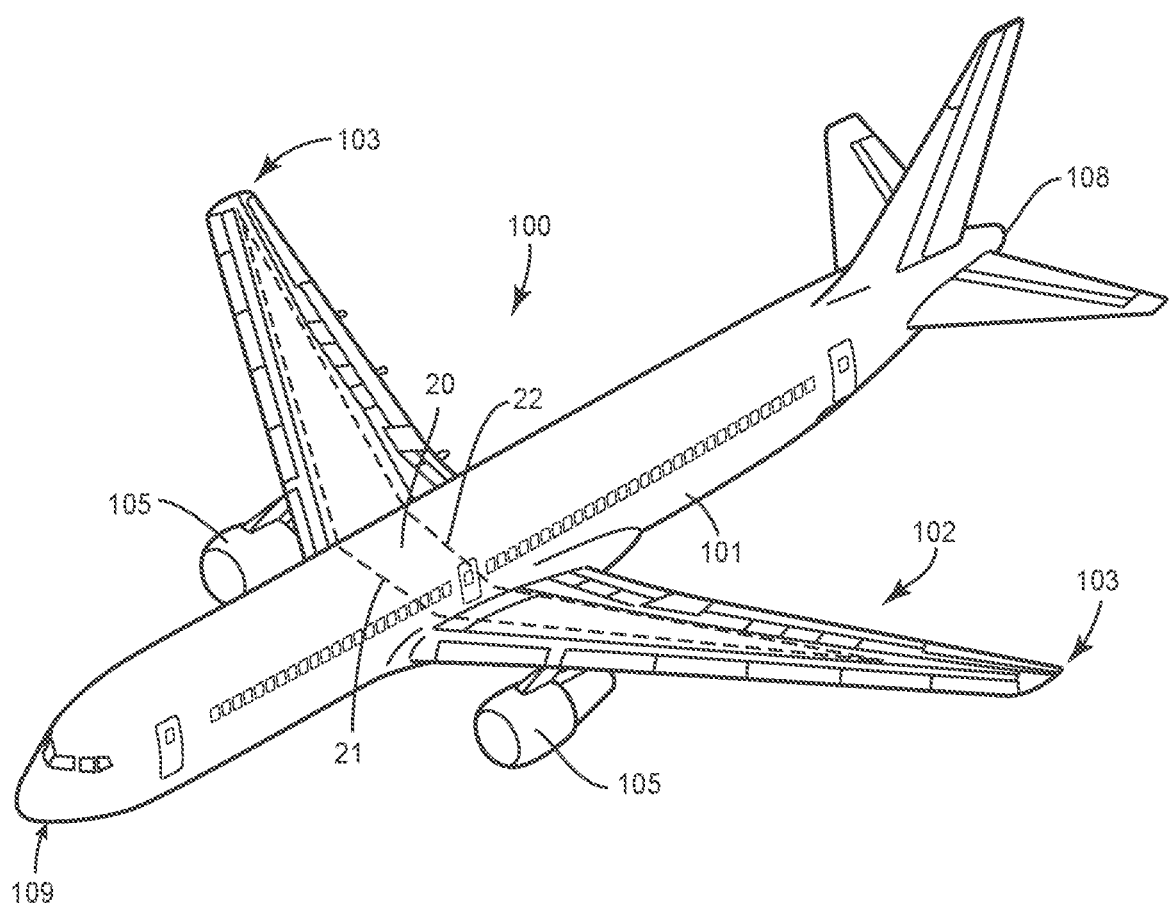
FIG. 1 is perspective view of an aircraft.

As seen in FIG. 1, an aircraft 100 includes a fuselage 101 with a nose 109 and a tail 108. A wing assembly 102 includes a center wing box 20 positioned between and supporting opposing wings 103. Engines 105 are attached to the wings 103 to power the aircraft during flight. The center wing box 20 is positioned in the fuselage 101 and operatively joins the wing assembly 102 with the fuselage 101.

Figure 2:
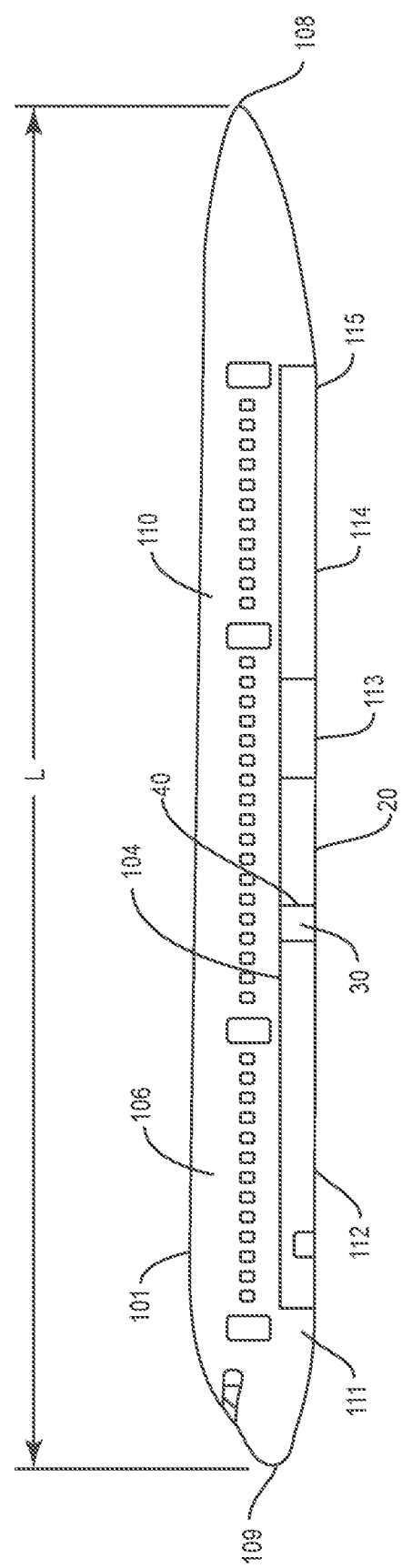
FIG. 2 is a side schematic view of a fuselage of an aircraft.

FIG. 2 illustrates a side schematic view of the fuselage 101 with the wings 103 removed for clarity. The fuselage 101 includes an elongated shape with a length L that extends between the tail 108 and nose 109. In one example as illustrated in FIG. 2, the fuselage 101 is divided into an upper section 110 and a lower section 111. The upper section 110 includes a cabin area 106 with a floor 104. The upper section 110 includes various components to provide for transporting passengers, such as but not limited to seats, overhead storage, restrooms, and various other amenities.

The lower section 111 is positioned below the floor 104 of the upper section 110. The lower section 111 includes a forward cargo deck 112 for holding cargo on either the right or left side of the fuselage 101. The center wing box 20 is located aft of the forward cargo deck 112. The center wing box 20 is connected to a bulkhead 30 at a joint 40 that is positioned aft of the forward cargo deck 112. A main landing gear wheel well 113 is positioned immediately aft of the center wing box 20. A lower aft hold 114 that includes an aft cargo hold or deck is positioned aft of the main landing gear wheel well 113.

The aircraft design with the bulkhead 30 offset from the center wing box 20 facilitates the assembly process when the aircraft 100 is manufactured in separate assemblies. This offset positioning facilitates rapid wing to body join when a mostly complete fuselage 101 is lowered onto a fully complete wing assembly 102. This supports a higher rate of production than would be available in other designs. In the illustrated embodiment, the aircraft 100 is a commercial aircraft with the upper section 110 configured for passengers and flight crew and the lower section 111 configured for cargo storage and aircraft equipment. The joint 40 that connects the center wing box 20 and bulkhead 30 is also applicable in various other aircraft, including but not limited to various commercial and non-commercial aircraft. These aircraft 100 can include the same or different configurations for storing cargo and/or passengers.

Figure 3:
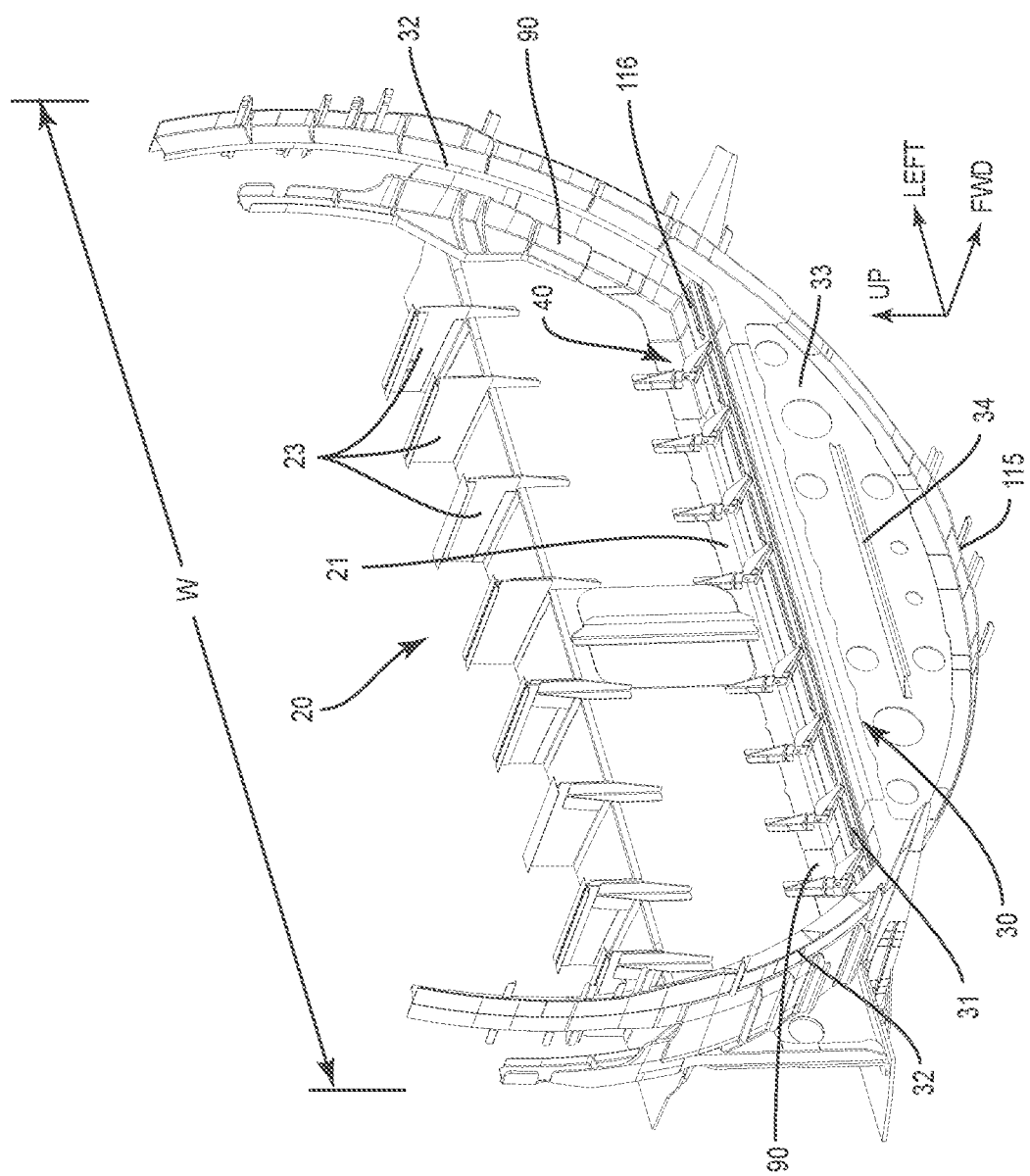
FIG. 3 is partial perspective view of a center wing box attached at a joint to a bulkhead within a fuselage of an aircraft.

FIG. 3 illustrates a forward section of the center wing box 20. The outer skin of the fuselage 101 is removed for clarity. The center wing box 20 includes spars, including a front spar 21, that extend across the width W of the fuselage 101. Overwing beam 23 are spaced apart across the width W and are aligned substantially perpendicular to the front spar 21. The center wing box 20 also includes an upper skin and lower skin (not illustrated). Stringers (not illustrated) can be attached to the skins to provide for additional mechanical support.

The bulkhead 30 is positioned across the width W of the fuselage 101. In one example as illustrated in FIG. 3, the bulkhead 30 is positioned at a bottom 115 of the fuselage 101. Other examples can include the bulkhead 30 having different heights relative to the bottom 115 of the fuselage 101. The center wing box 20 can also include various sizes and be positioned at various locations within the fuselage 101. In one example, both the center wing box 20 and the bulkhead 30 are contained within the lower section 111 of the fuselage 101. As illustrated in the example of FIG. 3, the bulkhead 30 has a limited height with a top 116 of the bulkhead 30 positioned below a top of the center wing box 20. This aligns the top 116 of the bulkhead 30 along the front spar 21.

The bulkhead 30 includes panels 32 with a curved shape that conform to the substantially rounded sectional shape of the fuselage 101. A horizontal deck 31 forms a chord that extends across the width W and is attached to the opposing sides of the panels 32. The bulkhead 30 also includes a vertical wall that includes a web 33 that extends between the horizontal deck 31 and the lower panels 32. In one example, the panel 32 is aligned substantially vertically within the fuselage 101. Horizontal stiffeners 34 are attached to and provide additional strength to the panel 32.

Figure 4:
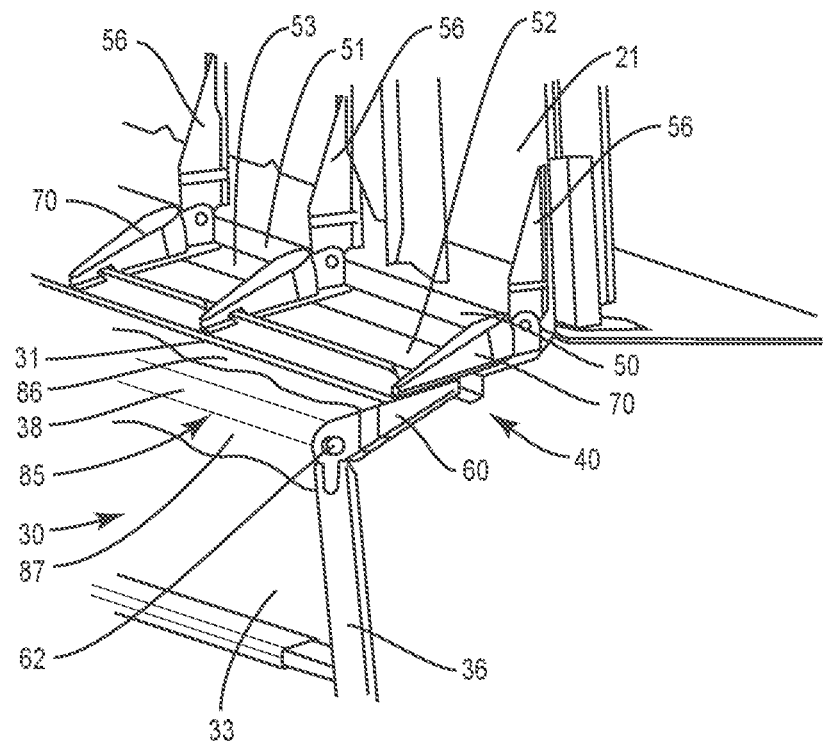
FIG. 4 is a partial perspective view of a joint connecting a center wing box and a bulkhead.
Figure 4A:
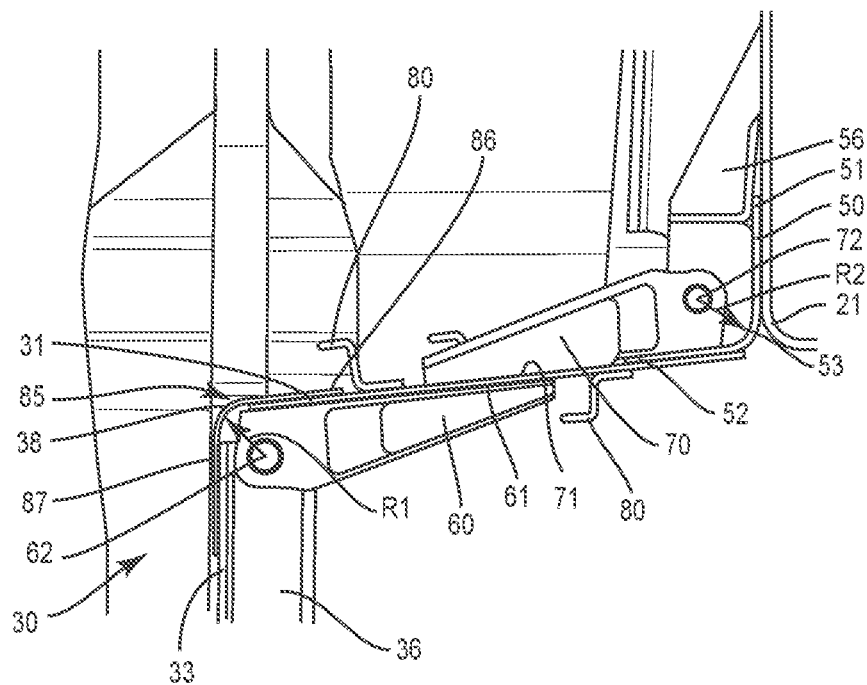
FIG. 4A is a side view of a joint connecting a center wing box and a bulkhead.
Figure 5:
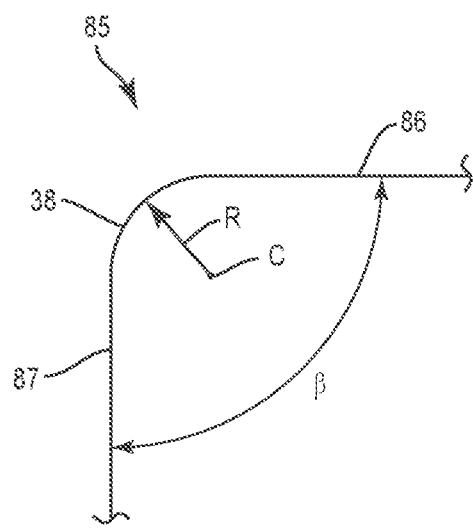
FIG. 5 is a schematic side view of a forward flex angle member.

As illustrated in FIGS. 4, 4A, and 5, a forward flex angle member 85 is positioned at the bulkhead 30. The forward flex angle member 85 includes a first section 87, second section 86, and an intermediate rounded corner 38. The corner 38 includes a rounded shape with a radius R1. In one example as illustrated in FIG. 5, the forward flex angle member 85 is a separate from the bulkhead 30 and includes the first section 87 being substantially planar to be positioned over the horizontal deck 31, a second section 86 that is substantially planar to be positioned over the web 33, and the rounded corner 38. The forward flex angle member 85 can be a single piece, or formed by two or more pieces that are integrally attached together. In other examples, one or both of the first and second sections 87, 86 are formed by sections of the bulkhead 30, including but not limited to the first section formed by the horizontal deck 31 and the second section formed by the web 33.

The corner 38 of the forward flex angle member 85 includes a radius R1 that extends from a center point C. The rounded corner 38 positions the first and second sections 87, 86 at an angle ß which can range between about 85° and about 95°. In one example, the angle ß is 90°.

The bulkhead 30 further includes vertical stiffeners 36 that are attached to and provide support to the web 33. The stiffeners 36 are attached to the web 33 in various manners, including but not limited to mechanical fasteners, adhesives, and combinations thereof. The vertical stiffeners 36 can be constructed of various materials, including but not limited to aluminum and titanium.

Support members 60 are attached to bulkhead 30 and provide support to the horizontal deck 31. Each of the support members 60 is attached to a vertical stiffener 36 at a pin 62. The pin 62 is coincident with the center point C of the radius R1 of the rounded corner 38. The support member 60 further includes a contact edge 61 that contacts against and supports and underside of the horizontal deck 31. In one example, the contact edge 61 is flat. In other examples, the contact edge 61 includes different shapes.

Figure 6:
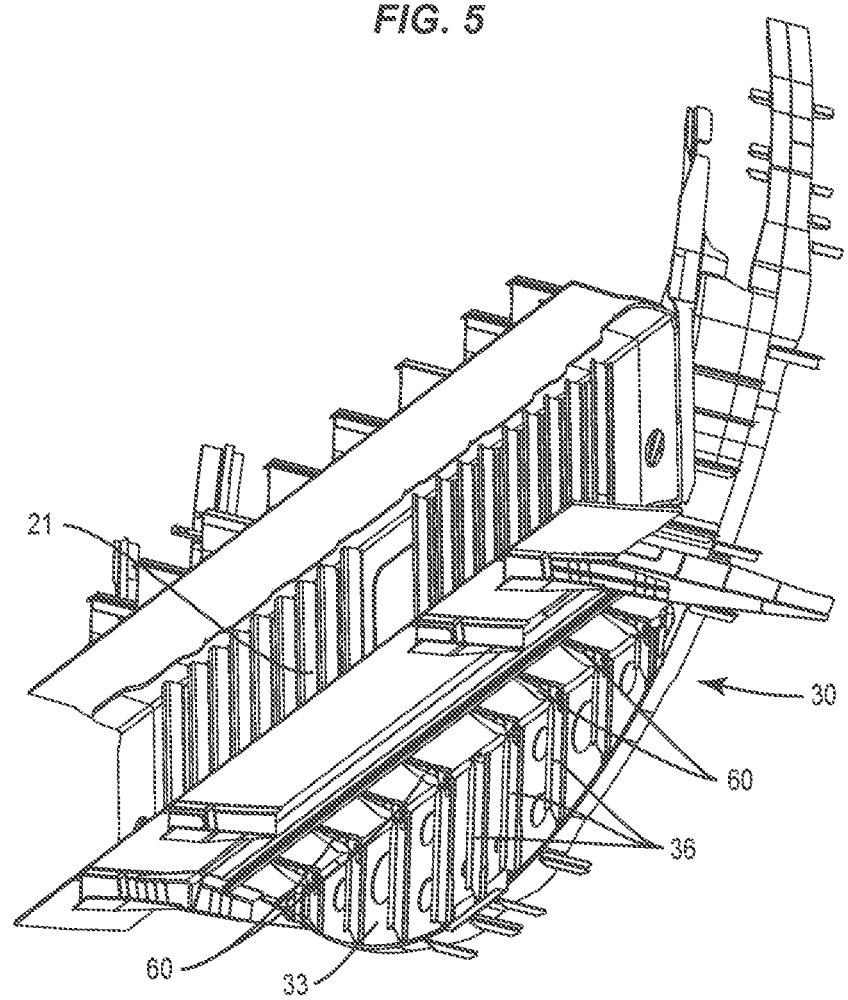
FIG. 6 is a partial perspective view of a joint connecting a center wing box and a bulkhead.
Figure 9:
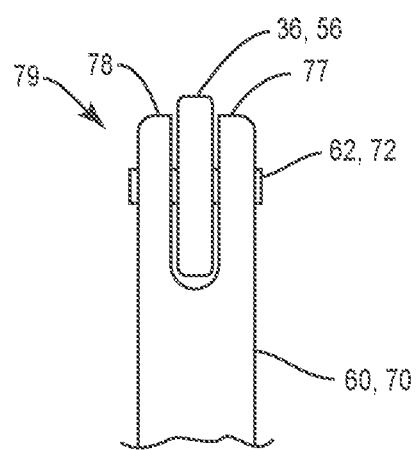
FIG. 9 is a schematic view of a connection of a support member and a stiffener or support fitting.

In one example as illustrated in FIG. 9, the support member 60 is formed as a lug 79 with a pair of spaced apart clevis 77, 78 sized to receive an end of the vertical stiffener 36. The pin extends through each clevis 77, 78 and the vertical stiffener 36. In another example, the support member 60 includes a single section that abuts against and is connected to one side of the vertical stiffener 36. As illustrated in FIG. 6, the vertical stiffeners 36 and support members 60 extend across the width of the bulkhead 30. In one example as illustrated in FIG. 6, the spacing is equal across the width of the bulkhead 30.

Figure 7A:
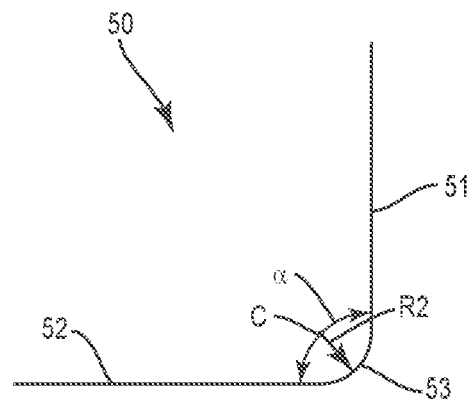
FIG. 7A is a schematic side view of a forward flex angle member.
Figure 7:
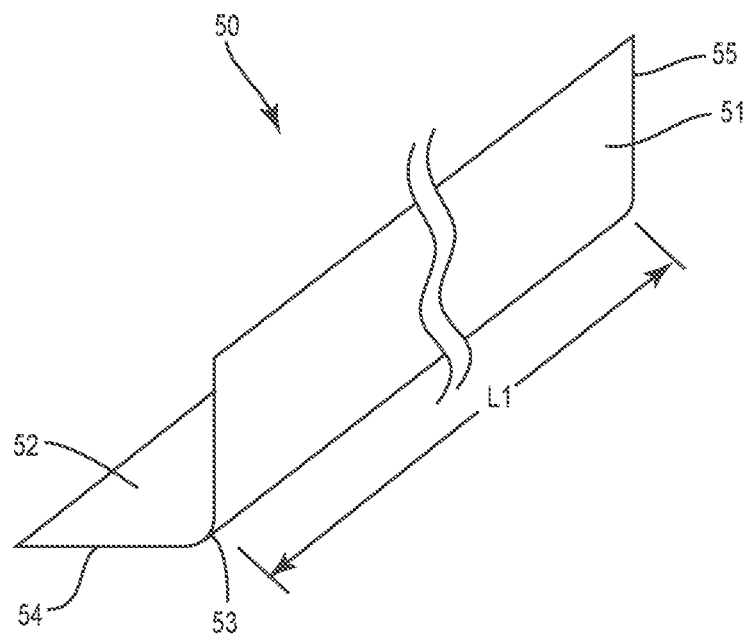
FIG. 7 is a perspective schematic view of a rear flex angle member.

A second flex angle member 50 is attached to and extends outward from the front spar 21. FIGS. 7 and 7A schematically illustrate the flex angle member 50 that includes a first section 51, a second section 52, and an intermediate rounded corner 53. Both the first and second sections 51, 52 are substantially flat with the rounded corner 53 having a radius R2. The first and second sections 51, 52 are aligned at angle α that can be within a range of between about 85°-95°. The flex angle member 50 includes a length L1 measured between opposing ends 54, 55. In one example as illustrated in FIG. 3, the length L1 is sized to extend across the width W of the lower section of the fuselage 101. In one example as illustrated in FIG. 4A, the aft flex angle member 50 is a separate from the center wing box 20. The aft flex angle member 50 includes the first section 51 being positioned against the center wing box 20, the second section 52 is positioned over the horizontal deck 31, and the rounded corner 53 is positioned at the intersection of the front spar 21 of the center wing box 20 and the horizontal deck 31. The forward flex angle member 85 can be a single piece, or formed by two or more pieces that are integrally attached together. In other examples, one or both of the first and second sections 51, 52 are formed by these components, including but not limited to the first section 51 formed by the front spar 21 and the second section 52 formed by the horizontal deck 31.

In one example, the flex angle member 50 includes the first and second sections and corner 53 constructed from a single piece. In other examples, the flex angle member 50 is constructed from two or more different pieces that are connected together.

In one example, one or both of the flex angle members 50, 85 is constructed of a fiber reinforced composite or metallic material, such as a carbon fiber reinforced polymer (CFRP) material. Fiber reinforced composite materials additionally or alternatively may be described as, or referred to as, fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In other examples, the flex angle member 50 is constructed from a metal and/or metal alloy.

The use of carbon fiber materials for one or both of the flex angle members 50, 85 provides for lower corrosion and fatigue cracking when compared to metallic materials. In one example, the aircraft design includes a fuselage 101 that is wide to accommodate a large cabin area 106 in the upper section 110. In one example, the cabin area 106 has a width to accommodate twin aisles and three sets of seats in each row. The wider fuselage cross section results in significantly higher relative lateral displacements of the wings 103 versus the fuselage 101 which challenges designs that include a metallic flex angle member 50 due to the high level of strain introduced to the flex angle member. The carbon fiber materials are also able to be exposed to moisture that can accumulate in this area of the aircraft 100 and lead to corrosion in other materials. Further, carbon fiber is better able to handle the significant cyclic loading that occurs during operation of the aircraft 100. Carbon fiber is less likely to have fatigue cracking. Further, the location of the joint 40 makes it difficult to access after the aircraft 100 is assembled thus design concerns that minimize issues are appreciated.

Figure 8:
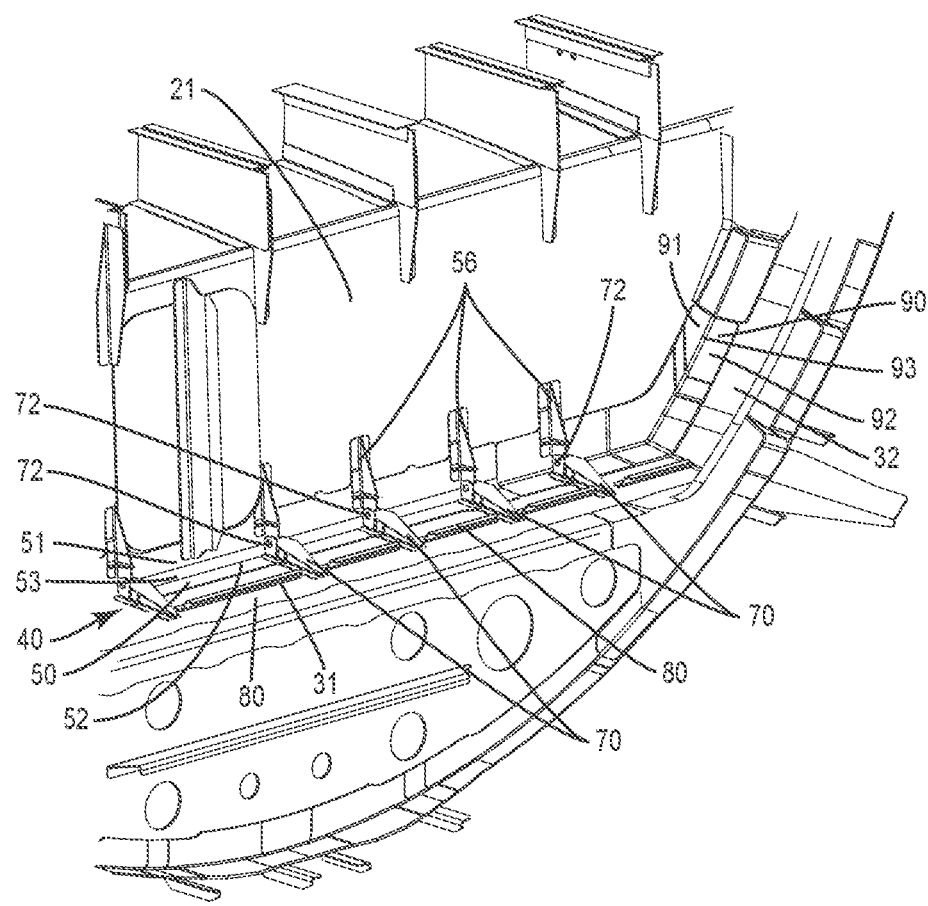
FIG. 8 is a partial perspective view of a joint connecting a center wing box and a bulkhead.

FIG. 8 illustrates flex angle members 50 mounted at the joint 40. For each flex angle member 50, the first section 51 is positioned against and attached to the front spar 21. The second section 52 is positioned on and overlaps with the horizontal deck 31 of the bulkhead 30. The first and second sections 51, 52 are attached by one or more mechanical fasteners and adhesives. In one example, the second section 52 overlaps with the first section 87 of the forward flex angle member 85.

Support fittings 56 extend over and are secured with adhesives and/or mechanical fasteners to the first section 51 of the flex angle member 50 and the front spar 21. In one example, the support fittings 56 have a T shape with a top member that contacts against the front spar 21 and first section 51, and an outwardly-extending brace. Support members 70 are attached to the support fittings 56.

Support members 70 are positioned on and attached to the second section 52 of the flex angle member 50. The support members 70 include a contact edge 71 that contacts the second section 52 and the horizontal deck 31 or first section 87. The attachment can be formed by one or more mechanical fasteners and adhesives. The support members 70 have a length to extend outward beyond the second section 52 and onto the horizontal deck 31. In one example as illustrated in FIG. 9, the support members 70 include a lug 79 with clevis 77, 78 that are spaced-apart clevis 78 and receive the support fitting 56. As illustrated in FIG. 7A, the pin 72 is coincident with a center C of the radius R2 of the rounded corner 53 of the flex angle member 50.

The location of the pin 72 at the corner 53 minimizes the bending of the flex angle member 50. This lowers the interlaminar stresses and laminate bending strain in the radius R2 to an acceptable level for the carbon fiber construction.

Stiffeners 80 are attached to the horizontal deck 31 and/or first section 87 of the flex angle member 85. The stiffeners 80 are aligned substantially perpendicular to the support members 70. The stiffeners 80 provide support to prevent buckling of the horizontal deck 31. One or more additional stiffeners 80 are attached to the underside of the horizontal deck 31 (see FIG. 4A).

As illustrated in FIGS. 4 and 4A, the support members 60, 70 are aligned in pairs across the length of the flex angle members 50, 85. Each pair includes a support member 70 on a first side of the horizontal deck 31 of the bulkhead 30 and a support member 60 on an opposing second side of the horizontal deck 31. The pairs can be spaced at various intervals across the flex angle members 50, 85. The lengths of the support members 60, 70 further provide for them to overlap one another. That is, the distal section of each support member 60, 70 overlap on opposing sides of the horizontal deck 31 of the bulkhead 30. This provides additional support to the bulkhead 30.

The joint 40 formed by the flex angle member 50 and support members 60, 70 is configured to both provide a pressure seal that seals the pressure difference between the center wing box 20 and the forward cargo deck 112. In one example, the center wing box 20 is in communication with the landing gear wheel well 113 and experiences a first pressure level, and the forward cargo deck 112 has a different second pressure level. In one example, the forward cargo deck 112 is pressurized during flight. The joint 40 is further configured to provide a shear continuous load path to accommodate movement of the center wing box 20 relative to the bulkhead 30 and/or fuselage 101. Further, the joint 40 allows for the wing assembly 102 to flex with respect to the fuselage 101. The flexible nature of the joint 40 is lighter than an otherwise rigid structure that would resist the movement and would add weight to the aircraft 100.

In one example, the flex angle member 50 is a single piece that extends across the width. In other examples, the flex angle member 50 is constructed from two or more separate pieces that each extend across a limited section of the width. When combined together, the separate pieces extend across the entire width to form the joint 40.

In one example, the joint 40 includes both an aft flex angle member 50 and a forward flex angle member 85. In another example, the joint includes just a single flex angle member (i.e., either just the aft flex angle member 50 or the forward flex angle member 85).

As illustrated in FIG. 3, the flex angle member 50 is positioned at a central section of the fuselage 101. In one example, the flex angle member 50 is centered along the width W. Corner fittings 90 are positioned on the lateral sides of the flex angle member 50. The corner fittings 90 provide further support to the flex angle member 50. The corner fittings 90 provide a substantial shear connection between the center wing box 20 and the horizontal deck 31.

As best illustrated in FIG. 8, the corner fittings 90 include an angled shape with a first section 91 that contacts against the front spar 21 and a second section 92 that contacts against the panels 32 of the bulkhead 30. A corner 93 is positioned between the first and second sections 91, 92 and seats in the intersection of the front spar 21 and panels 32. The corner fittings 90 include an angle shape with the first and second sections 91, 92 aligned at an angle within a range of about 85°-95°. The corner fittings 90 include a different construction than the flex angle member 50 and are less flexible than the flex angle member 50. In one example, the corner fittings 90 are constructed from titanium or aluminum. The corner fittings 90 are attached to the other structures through one or more of mechanical fasteners and adhesives.

One or more support members 70 are connected to the front spar 21 and are positioned on the corner fittings 90. The support members 70 are connected with pins 72 to the support fittings 56 and have a length to extend over and be connected to each of the second section 92 and the horizontal deck 31. Likewise, one or more support members 60 are connected with pins 62 to the web 33 of the bulkhead 30. The support members 60 extend outward from the web 33 on a second side of the horizontal deck 31. In one example, the support members 60, 70 aligned with the corner fittings 90 are aligned in pairs.

In one example, corning fittings 90 are further positioned against the bulkhead 30 to support the flex angle member 85.

Figure 10:
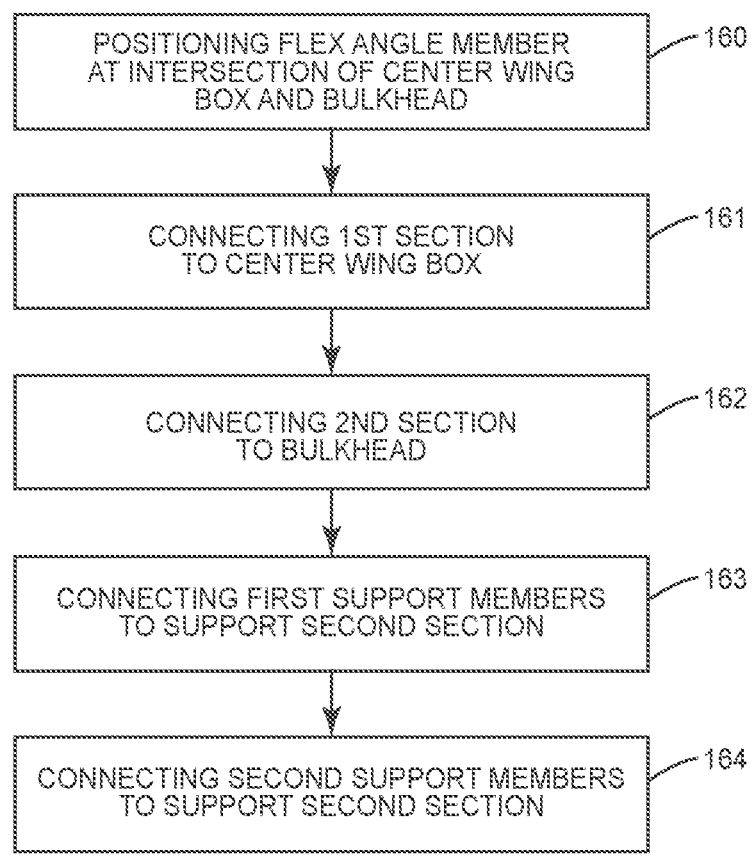
FIG. 10 is a flowchart diagram of a method of connecting a center wing box to a bulkhead of an aircraft.

FIG. 10 illustrates a method of connecting a center wing box 20 to a bulkhead 30 of an aircraft 100. The method includes positioning a rounded intermediate corner 53 of a flex angle member 50 at an intersection of the center wing box 20 and the bulkhead (block 160). The method includes connecting a first section 51 of the flex angle member 50 to the center wing box 20 (block 161) and connecting a second section 52 of the flex angle member 50 to the bulkhead 30 (block 162). First support members 70 are connected to the center wing box 20 (block 163). The first support members 70 support a first side of the second section 52 of the flex angle member 50. Second support members 60 are connected to the bulkhead 30 (block 164). The second support members 60 support the opposing second sides of the second section 52.

The designs disclosed above with the joint 40 connecting the center wing box 20 to the low bulkhead 30 allows a rapid wing to body join where a mostly complete fuselage 101 is lowered onto a fully complete wing assembly 102. This enables higher production rates and saves factory space and assembly costs. This design also decouples the wing and fuselage loading, allow them to deform independently at the front spar 21. Further, the design provides for a cost and weight improvement as it eliminates structure which forces the wing and fuselage to move in tandem which is expensive and may have maintenance issues.

The device 10 can be used on a variety of aircraft 100. Aircraft 100 include but are not limited to manned aircraft, unmanned aircraft, manned spacecraft, unmanned spacecraft, manned rotorcraft, unmanned rotorcraft, satellites, rockets, missiles, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A joint for connecting a center wing box to a bulkhead of an aircraft with the bulkhead comprising a web and a deck, the joint comprising:
    a flex angle member comprising a first section shaped to abut against and be connected to one of the center wing box and the bulkhead, a second section shaped to abut against and be connected to a first side of the deck of the bulkhead, and an intermediate rounded corner positioned between the first and second sections;
    first support members attached to the center wing box at first pins; and
    second support members attached to the web of the bulkhead at second pins;
    one of the first and second support members supports the second section of the flex angle member; and
    the first support members are positioned on a first side of the deck of the bulkhead and the second support members are positioned on an opposing second side of the deck.

2. The joint of claim 1, wherein the first support members support the second section of the flex angle member and the first pins are coincident with a center of a radius of the intermediate rounded corner of the flex angle member.

3. The joint of claim 2, wherein the second support members support the second section of the flex angle member and the second pins are positioned at a point incident with a center of a radius of the rounded corner that is positioned at an intersection of the web and the deck of the bulkhead.

4. The joint of claim 1, further comprising:
    support fittings attached to the center wing box with the first support members mounted to the support fittings with the first pins; and
    stiffeners mounted on the web of the bulkhead with the second support members mounted to the stiffeners with the second pins.

5. The joint of claim 4, wherein the first and second support members comprise a lug with opposing clevis and the support fittings and stiffeners are positioned between the clevis.

6. The joint of claim 1, wherein the flex angle member is constructed from one of fiber reinforced composite and metallic material.

7. The joint of claim 6, further comprising corner fittings laterally offset from the flex angle member and comprising first and second sections aligned at an angle to fit at an intersection of the center wing box and the bulkhead, the corner fittings comprising a different construction than the flex angle member and are less flexible than the flex angle member.

8. The joint of claim 1, wherein the flex angle member is a first flex angle member and abuts against and is connected to the center wing box and further comprising a second flex angle member that abuts against and is connected to the web of the bulkhead and the deck.

9. The joint of claim 1, wherein the first and second support members are aligned in pairs with the first and second support members of each of the pairs overlapping on opposing sides of horizontal deck.

10. A joint that connects a center wing box to a bulkhead of an aircraft, the aircraft having a fuselage, a wing assembly with the center wing box positioned in the fuselage and wings that extend outward from opposing sides of the fuselage, and the bulkhead positioned in the fuselage and with a web and a deck, the joint comprising:
    a flex angle member comprising a first section that is connected to one of the center wing box and the bulkhead, a second section that extends across the deck of the bulkhead, and an intermediate corner positioned between the first and second sections;
    first support members spaced apart across a width of the fuselage on a first side of the deck; and
    second support members spaced apart across a width of the fuselage on an opposing second side of the deck;
    one of the first and second support members supports the second section of the flex angle member.

11. The aircraft of claim 10, wherein the first support members support the second section and the first support members are attached to the center wing box with pins that are located at a center of a radius of the corner.

12. The aircraft of claim 11, wherein the second support members support the second section and are attached to the web with pins that are located at a center of a radius of the corner.

13. The aircraft of claim 10, wherein the first and second support members are aligned in pairs along the width of the fuselage, with the first and second support members of each of the pairs overlapping on opposing sides of the deck.

14. The aircraft of claim 10, wherein the flex angle member is a first flex angle member that is attached to the center wing box and further comprising a second flex angle member with a first section that is attached to the web, a second section that is positioned across the deck, and a rounded intermediate corner.

15. The aircraft of claim 10, wherein the flex angle member is located along a central section of the fuselage and further comprising angled corner fittings laterally offset from and on opposing sides of the flex angle member, the angled corner fittings having an angled shape to contact against the center wing box and the deck of the bulkhead and comprising a different construction than the flex angle member and are less flexible than the flex angle member.

16. The aircraft of claim 10, wherein the flex angle member is a first flex angle member that is connected to the center wing box and further comprising one or more additional flex angle members, the additional flex angle members comprising a first section that is connected to the center wing box, a second section that extends outward from the center wing box and extends across the deck of the bulkhead, and an intermediate corner.

17. A joint for connecting a center wing box to a bulkhead of an aircraft with the bulkhead comprising a web and a deck, the joint comprising:
- a flex angle member comprising a first section shaped to abut against and be connected to one of the center wing box and the bulkhead, a second section shaped to abut against and be connected to a first side of the deck of the bulkhead, and an intermediate section positioned between the first and second sections;
- first support members attached to the center wing box; and
- second support members attached to the web of the bulkhead;
- one of the first and second support members supports the second section of the flex angle member; and
- the first support members are positioned on a first side of the deck of the bulkhead and the second support members are positioned on an opposing second side of the deck.

18. The joint of claim 17, wherein the intermediate section is a corner comprising a rounded shape that transitions between the first section and the second section.

19. The joint of claim 17, wherein the first and second support members are aligned in pairs and arranged in an overlapping configuration.

20. The joint of claim 17, wherein the wherein the flex angle member is a first flex angle member and abuts against and is connected to the center wing box and further comprising a second flex angle member that abuts against and is connected to the web of the bulkhead and the deck.

* * * * *